United States Patent [19]

Ross

[11] Patent Number: 4,498,350
[45] Date of Patent: Feb. 12, 1985

[54] SHIFTING MECHANISM
[75] Inventor: Alan R. Ross, Lyndhurst, Ohio
[73] Assignee: Eaton Corporation, Cleveland, Ohio
[21] Appl. No.: 420,194
[22] Filed: Sep. 20, 1982
[51] Int. Cl.³ .................... F16H 27/02; F16H 29/02
[52] U.S. Cl. ................ 74/89.15; 74/424.8 VA; 192/109 A
[58] Field of Search ............. 74/89.15, 424.8 VA, 74/473 R, 335; 192/109 A

[56] References Cited

U.S. PATENT DOCUMENTS

| | | | |
|---|---|---|---|
| 1,177,133 | 3/1916 | Parker | 192/109 A X |
| 1,225,144 | 5/1917 | Land | 192/109 A |
| 1,873,725 | 8/1932 | Thompson | 74/473 R X |
| 2,019,073 | 10/1935 | Cooper et al. | 74/473 X |
| 2,253,711 | 8/1941 | Kearns | 192/109 A X |
| 2,704,666 | 3/1955 | Tyler | 192/109 A X |
| 2,754,692 | 7/1956 | Russell | 74/473 |
| 2,768,532 | 10/1956 | Russell | 74/424.8 |
| 2,850,920 | 9/1958 | Buckendale | 74/665 |
| 2,948,370 | 8/1960 | Winther et al. | 192/4 |
| 3,122,936 | 3/1964 | Dykes | 74/335 |
| 3,132,531 | 5/1964 | Boughner | 74/335 |
| 3,162,098 | 12/1964 | Lindberg | 74/89.15 X |
| 3,277,734 | 10/1966 | Bernard | 74/335 |
| 3,400,610 | 9/1968 | Taylor et al. | 74/710.5 |
| 3,436,973 | 4/1969 | Aweimrine | 74/89.15 |
| 3,479,890 | 11/1969 | Howell | 74/89.15 |
| 3,910,131 | 10/1975 | Richards | 74/331 |
| 4,261,536 | 4/1981 | Melcher et al. | 74/89.15 X |
| 4,425,814 | 1/1984 | Dick | 192/109 A X |
| 4,449,416 | 5/1984 | Huitema | 74/473 R X |

FOREIGN PATENT DOCUMENTS

| | | | |
|---|---|---|---|
| 0060727 | 5/1980 | Japan | 192/109 A |
| 325263 | 2/1930 | United Kingdom | 74/473 R |

Primary Examiner—George H. Krizmanich
Assistant Examiner—Dirk Wright
Attorney, Agent, or Firm—C. H. Grace; A. E. Chrow

[57] ABSTRACT

A shift mechanism (66, 68, 70, 72) for shifting a member (22, 22A', 22B, 27C) for performing an operation at a preselected one of at least two spaced-apart operating positions. The mechanism comprises a threaded screw (10, 10A, 10B, 10C) that is rotated about its central longitudinal rotational axis ("C") by a motor (14, 14A, 14B, 14C) to move a drive nut (12, 12A, 12B, 12C) in opposite axial directions therealong relative the particular direction the shaft is rotating and causes the drive nut to compress a resilient biasing means (20, 20', 20A, 20A', 20B, 20B', 20C, 20C') which is adapted to urge the member (22, 22A', 22B, 27C) to the particular position in a preloaded condition such that the operation is able to be performed by overcoming any resistance incurred in performing the operation or upon removal of the resistance upon the occurance of an event enabling the operation to occur.

14 Claims, 4 Drawing Figures

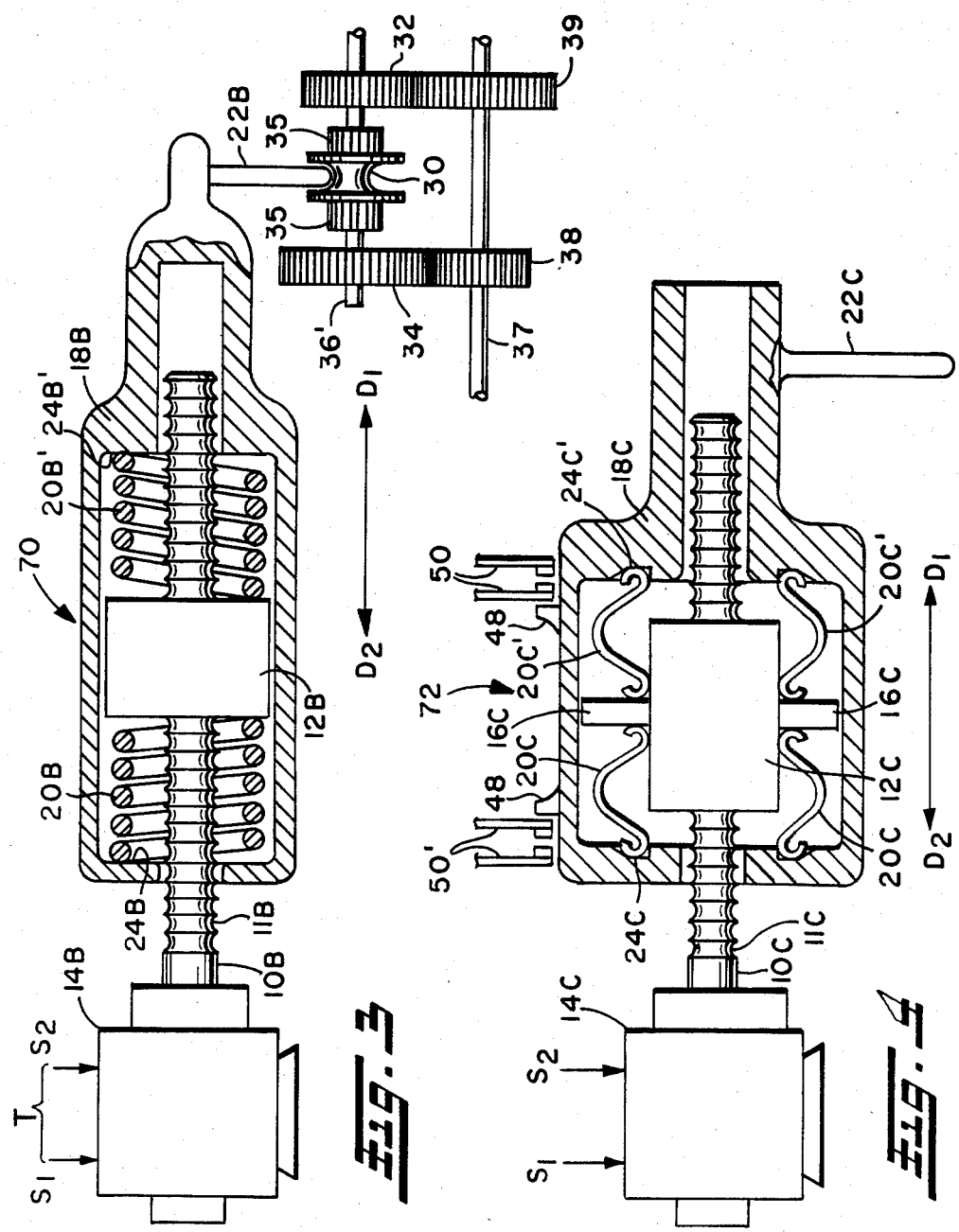

SHIFTING MECHANISM

BACKGROUND OF THE INVENTION

This invention is related to a mechanism for positioning a means for performing at least one operation at a selected one of at least two selectable spaced-apart operating positions and more particularly to such mechanism that is provided with at least one pair of oppositely acting resilient biasing means that are able to be sufficiently compressed by any resistance encountered during the positioning to apply a biasing force sufficient to place the mechanism in a preloaded condition sufficient to enable the operating means to perform the operation desired at the particular operating position when the resistance is overcome or otherwise is removed upon the occurance of an event enabling the operation to occur.

DESCRIPTION OF THE PRIOR ART

Two position shifting mechanisms for selectively shifting or positioning a shift fork or the like are well known in the art. Such mechanisms are typically utilized to engage one of two engageable gears, to engage or disengage a single gear and to engage or disengage a lockup device. Commonly, such mechanisms utilize a rotatable threaded screw and moveable nut such as the ball nut and ball screw disclosed in U.S. Pat. Nos. 2,768,532; 2,948,370; 3,132,531; 3,277,734 and 3,400,610, the disclosures of which are incorporated herein by reference. In many applications there exists a need to gently engage with or disengage from a particular operation in a controlled manner such as, for example, when attempting to engage a clutch with a rotating gear. Although the above devices are able to utilize a ball nut and ball screw to advantage to engage or disengage a gear or the like, they are not able to preload the device so that the engagement or disengagement can be made with the least amount of abruptness such as upon the occurance of an event enabling the engagement or disengagement to occur such as engaging a clutch or releasing an accelerator pedal so as to provide a smooth transition with reduced chance for damage.

Some two-position shift actuators allow a shift to a preselected position by preloading an element, usually a spring, to bias the shifting mechanism, usually a shifting fork, towards the preselected position. Examples of such devices are disclosed in U.S. Pat. Nos. 2,754,692; 2,850,920; 3,122,936; 3,277,734 and 3,910,130, the disclosures of which are incorporated herein by reference. Although the above devices offer a partial solution to the problem of providing a smooth transition in an operation such as engaging or disengaging a clutch with another gear, they are complicated in their structure and expensive to produce and are not able to provide for a smooth transition in performing one or more operations at each one of one or more spaced-apart operating positions.

SUMMARY OF THE INVENTION

Accordingly, it is an object of this invention to provide a mechanism enabling the performance of at least one operation at a selected one of at least two selectable spaced-apart operating positions in a smooth and inexpensive manner.

It is another object of this invention to provide a mechanism that is able to position a means for performing at least one operation at a selected one of at least two spaced-apart operating positions and preload a component of the mechanism sufficiently to enable the performance of the operation at the respective operating positions at the time at which the operation can be undertaken with the least amount of abruptness.

It is a feature of this invention to provide a mechanism for axially moving a clutch in a preloaded condition for engagement with a selected one of at least two spaced-apart selectable gears in a smooth manner so as to reduce wear and minimize or eliminate damage upon the occurance of an event enabling the engagement to occur.

These and other objects and advantages of the present invention will become apparent from a reading of the description of the preferred embodiments taken in connection with the attached drawings.

BRIEF DESCRIPTION OF THE DRAWINGS

FIG. 3 shows a side elevation view, partially in cross-section, showing another embodiment of the mechanism of the invention; and FIG. 4 shows a side elevation view, partially in cross-section, showing another embodiment of the mechanism of the invention.

DESCRIPTION OF THE PREFERRED EMBODIMENTS

Figure 1:
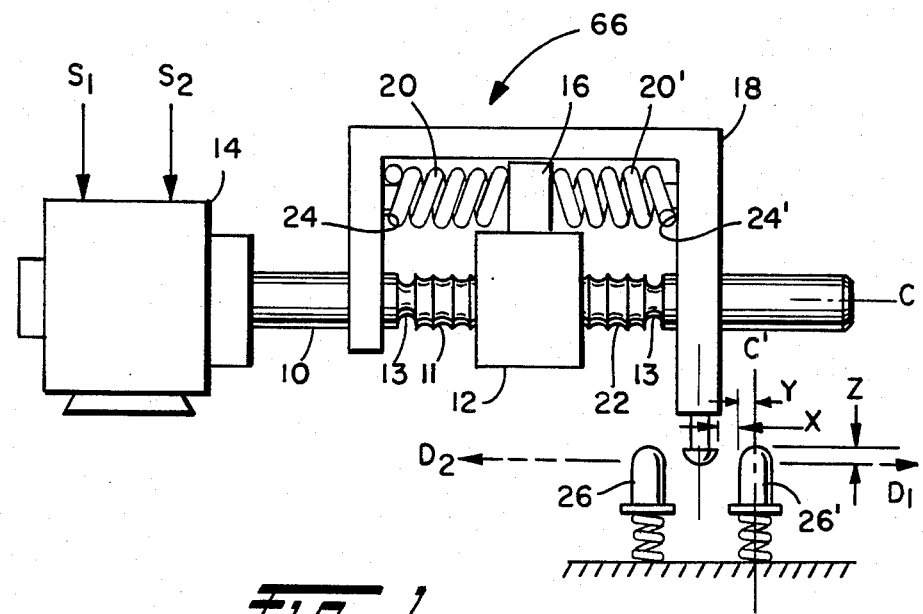
FIG. 1 shows a side elevation view of an embodiment of the mechanism of the invention.

FIG. 1 shows an embodiment of the mechanism of the invention in the form of mechanism 66. Mechanism 66 has a shaft 10 having a central longitudinal rotational axis "C" extending between opposite ends thereof. Shaft 10 has external threads 11 which may be either right handed or left handed threads when viewed from one of the ends of shaft 10. Drive nut 12 is threadingly mounted on threads 11 of shaft 10 and able to move axially in one direction along shaft 10 when shaft 10 is rotated in one direction about axis "C" and in an opposite axial direction along shaft 10 when shaft 10 is rotated in an opposite direction about axis "C". The distance that drive nut 12 travels in either direction along shaft 10 is determined by the angle between the thread and axis "C" and the speed and time of rotation of shaft 10 in either the one or the opposite direction. The length that shaft 10 is threaded must be enough to accomodate the travel desired of drive nut 12 in either direction along shaft 10. Since only a portion of shaft 10 is threaded in FIG. 1, drive nut 12 must necessarily be assembled onto the threaded portion of shaft 10 since it will not be able to pass over the non-threaded portion as shown in FIG. 1. Preferably, shaft 10 is threaded for its entire length except for that portion at one end to which it is desired to attach a driving mechanism. Although shaft 10 and drive nut 12 may be made from any material that will suitably enable drive nut 12 to move in either direction along shaft 10 and exert a force in the direction of movement as hereinafter described, it is preferred that shaft 10 and drive nut 12 be made from a suitable metallic material such as a steel or a brass. Although shaft 10 and drive nut 12 may be a conventional screw and threaded drive nut, it is preferred that shaft 10 be a ball screw and that drive nut 12 be a drive ball nut for reducing friction and increasing efficiency as is well known to those ordinarily skilled in the art.

As shown in FIG. 1, one end of shaft 10 is operably connected to driving means 14. Driving means 14 is any device such as an electrical or hydraulic motor that can be directly or indirectly drivingly connected to shaft 10 and able to rotate shaft 10 in one direction when it receives an input signal $S_1$ and can rotate shaft 10 in an opposite direction when it receives a second input signal $S_2$. Driving means 14 is prefereably a bidirectional electric motor that in response to an electrical input signal $S_1$ is able to rotate shaft 10 in one direction (i.e. clockwise) about the central longitudinal axis "C" of shaft 10 and is also able to rotate shaft 10 in an opposite direction (i.e. counterclockwise) in response to a second electrical input signal $S_2$. Input signals $S_1$ and $S_2$ may for example be provided by a two position switch located in the cab of a truck where it is desired to use the mechanism of the invention to shift from low to high gear or from high gear to low gear as hereinafter described with respect to FIGS. 3 and 4. Although shaft 10 is shown in FIG. 1 as being directly connected to driving means 14, such is for illustrative purposes only, for driving means 14 may be directly or indirectly drivingly connected to shaft 10 in any suitable manner such as for example where shaft 10 is supported by journal bearings and a gear reducer is disposed intermediate shaft 10 and driving means 14.

Frame 18 is disposed movably with respect to shaft 10 and drive nut 12. In mechanism 66, frame 18 has openings, not referenced, through opposite spaced-apart walls that are large enough to permit frame 10 to slide in either direction along shaft 10. The openings in frame 18 are aligned so that frame 18 is able to slide in a direction (and reverse direction) that is substantially parallel to axis "C" of shaft 10.

Drive nut 12 has a protuberance 16 which extends from one side thereof as shown in FIG. 1. A resilient biasing means 20 is disposed on one side of drive nut 12 (and of protuberance 16) intermediate drive nut 12 and a first component 24 of frame 18. A resilient biasing means 20' is also disposed on the opposite side of drive nut 12 (and protuberance 16) intermediate drive nut 12 and a second component 24' of frame 18 that is spaced-apart from component 24. Components 24 and 24' are components of frame 18 against which resilient biasing means 20 and 20' may respectively press when compressed by movement of drive nut 12 along shaft 10 in the direction of either component 24 or 24'. Preferably components 24 and 24' are spaced-apart facing surfaces of frame 10 that are large enough to provide a suitable surface or spring seat against which biasing means 20 and 20' may be compressed.

Although biasing means 20 and 20' are respectively shown in the form of coiled springs in FIG. 1, they may comprise any suitable resilient biasing means made from any suitable material and may have any shape such that when compressed by movement of drive nut 12 towards frame components 24 and 24' respectively are able to apply a biasing force against components 24 and 24' respectively sufficient to urge frame 18 along shaft 10 to the operating position desired in a preloaded condition sufficient to perform the particular operation desired at the operating position.

In the embodiment of mechanism 66 of FIG. 1, frame 18 is slidingly mounted on shaft 10 and since biasing means 20 and 20' are aligned substantially parallel to shaft 10, movement of drive nut 12 along shaft 10 toward the viewer's right will cause protuberance 16 to press against biasing means 20' and press biasing means 20' against surface 24' and move frame 18 in a direction $D_1$ toward the viewer's right which is direction substantially parallel to axis "C" of shaft 10. Conversely, movement of drive nut 12 toward the viewer's left will cause protuberance 16 to press against biasing means 20 and cause biasing means 20 to press against surface 24 and move frame 18 towards the viewer's left in a direction $D_2$ which is opposite to direction $D_1$ and also substantially parallel to axis "C" of shaft 10. Whether drive nut 12 moves towards the viewer's right or left is determined by the direction of rotation of shaft 10 which is controlled respectively by input signals $S_1$ and $S_2$ to driving means 14 as previously described.

A means associated with frame 18 for performing at least one operation at each of at least one operating position located along direction $D_1$ and $D_2$ is shown in FIG. 1 in the form of pressure foot 22 which extends downwardly from frame 18 as shown in FIG. 1. Pressure foot 22 moves simultaneously with frame 18 in either direction $D_1$ or $D_2$ depending upon the direction of movement of frame 18. Spaced-apart spring loaded valve members 26 and 26' are respectively located along directions $D_1$ and $D_2$ as shown in FIG. 1. The operation to be performed is deflection of each valve member 26 a distance "z" in a direction substantially transverse to directions $D_1$ and $D_2$.

Movement of frame 18 a distance "x" toward the viewer's right will move pressure foot 22 a distance "x" along direction $D_1$ until pressure foot 22 impinges upon valve 26 having centerline C' at the first operating position along direction $D_1$ as shown in FIG. 1. Valve 26 will exert a resistance to further movement of pressure foot 22 (and frame 18) along direction $D_1$ that is proportional to the amount of force required to deflect valve 26 the distance "z". The continued movement of drive nut 12 toward the viewer's right will cause biasing means 20' to be compressed between protuberance 16 and surface 24' which, by proper selection of the biasing means, is sufficient to overcome the resistance and move frame 18 and pressure foot 22 a further distance along direction $D_1$ which enables pressure foot 22 to deflect valve 26 the distance "z". As can be seen in FIG. 1, drive nut 12 is also able to move frame 18 in direction $D_2$ toward the viewer's left to deflect valve 26 located at the second operating position in the manner described for deflecting valve 26'. Also shown in FIG. 1 are undercut grooves 13 in shaft 10. Grooves 13 are cut into shaft 10 at locations respectively corresponding to to the position of drive nut 12 along shaft 10 required to position frame 18 and operating means 22 respectively at operating positions of spaced-apart valves 26 and 26'. Grooves 13 provide a means of stopping drive nut 12 by causing drive nut 12 to free-wheel about shaft 10 and cease further advancement along shaft 10 when frame 18 has respectively reached the operating positions of valve 26 and 26'. Drive nut 12 may they be caused to move in the opposite axial direction along shaft 10 towards the second operating position by receipt of a signal by driving means 14 causing driving means 14 to rotate shaft 10 in the opposite direction. Other means such as limit switches or the like may be employed to stop the rotation of shaft 10 where desired to stop drive nut 12 at positions along shaft 10 corresponding to the operating positions of frame 18 and operatingg means 22 desired. Alternatively, signals $S_1$ and $S_2$ may be timed so as to enable driving means 14 to rotate shaft 10 only for the number of revolutions required to move drive nut 12 for a distance along shaft 10 sufficient to cause frame 18 to reach the respective operating positions in the manner desired.

Thus the mechanism of the invention enables one or more operating means associated with the frame to be moved in different, preferably opposite, directions to each of at least two spaced-apart operating positions laying along the respective different directions in response to movement of the frame caused by biasing means that are respectively urged against a component of the frame member in response to movement of the drive nut along the shaft in response to the particular direction of rotation of the shaft and which biasing means are respectively able to be compressed in response to resistance arising from the operation to be performed at the particular operating-position sufficiently to overcome the resistance or when the resistance is removed to apply a biasing force to the frame that is sufficient to enable the operating means associated with the frame to perform the operation desired.

Figure 2:
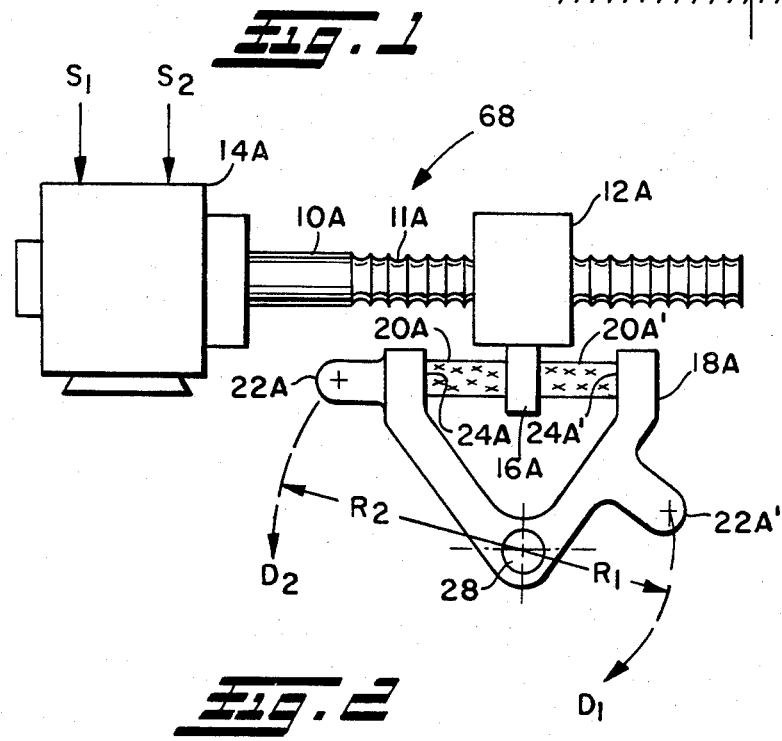
FIG. 2 shows a side elevation view of another embodiment of the mechanism of the invention.

FIG. 2 shows an embodiment of the mechanism of the invention in the form of mechanism 68 which illustrates that the movement of the operating means associated with the frame of the mechanism is not limited to opposite directions of movement of the frame that are substantially parallel to the longitudinal axis "C" of the shaft. In FIG. 2, the suffix "A" is used to denote components of mechanism 68 previously described with respect to mechanism 66 of FIG. 1.

Mechanism 68 has a driving means 14A that is operably connected to one end of shaft 10A having threads 11A that is able to rotate in opposite directions in response to whether an input signal $S_1$ or an input signal $S_2$ is received by driving means 14A as previously described. Drive nut 12A is threadingly mounted on shaft 10A and caused to move in one axial direction along shaft 10A in response to rotation of shaft 10A in one direction and in an opposite axial direction along shaft 10A in response to rotation of shaft 10A in an opposite direction as previously described.

Frame 18A is moveably disposed with respect to shaft 10A and drive nut 12A by being pivotably mounted at pivot 28. Protuberance 16A extends from drive nut 12A intermediate resilient biasing means 20A disposed between one side of protuberance 16A and a surface 24A of frame 18A and resilient biasing means 20A' is disposed between an opposite side of protuberance 16A and a surface 24A' of frame 18A. Surfaces 24A and 24A' are preferably spaced-apart surfaces that face towards each other as previously described. Biasing means 20A and 20A' are made from a resilient material such as a suitable rubber or rubber-like material or other material that is able to be pressed respectively against surfaces 24A and 24A' by drive nut 12A and move frame 18A to at least one operating position located in opposite directions of movement of frame 18A and is able to be compressed by resistance to further movement of frame 18A in the particular direction and apply a biasing force to frame 18A that is able to overcome the resistance and move frame 18 a further distance in the particular direction to enable the operation or operations to be performed that are desired to be performed at the particular operating position. Operating means associated with frame 18A for performing the operation are shown in FIG. 2 as extensions 22A and 22A'. Extensions 22A and 22A' may be connected to one or more linking members, not shown, designed to perform the particular operation or operations desired at one or more operating positions located respectively along directions $D_2$ and $D_1$. It can readily be seen from FIG. 2 that movement of drive nut 12A toward the viewer's right will cause one side of protuberance 16A to press against biasing means 20A' which in turn will cause biasing means 20A' to press against surface 24A' and cause frame 18A to pivot clockwise about pivot 28 and cause extension 22A' to move along a curved path having a radius $R_1$. Conversely, movement of drive nut 12A toward the viewer's left will cause frame 18A to rotate counterclockwise about pivot 28 and cause extension 22A to follow a curved path in the direction of $D_2$ having a radius $R_2$. Biasing means 22A and 20A' are selected such that, when compressed by the resistance arising from the particular operation to be performed at the operating positions, the biasing means is able to apply a biasing force sufficient to move extensions 22A and 22A' for a further distance along their respective paths sufficient to enable the particular operation to be performed.

FIG. 3 shows an embodiment of the mechanism of the invention in the form of mechanism 70 which is adapted to engage spaced-apart first gear 32 and second gear 34. The suffix "B" is used in FIG. 3 to denote components of mechanisms 66 and 68 previously described with respect to FIGS. 1 and 2. Mechanism 70 has a shaft 10B having threads 11B that is drivingly connected to driving means 14B that is able to rotate shaft 10B in opposite directions in response to receiving input signals $S_1$ and $S_2$ respectively. Drive nut 12B is threadingly mounted on shaft 10B and able to move in opposite axial directions along shaft 10B in response to the particular direction in which shaft 10B is rotating. Frame 18B is disposed coaxially about shaft 10B, drive nut 12B and biasing means 20B and 20B'. Biasing means 20B and 20B' are respectively in the form of coiled springs which are disposed coaxially about shaft 10B respectively intermediate one side of drive nut 12B and a surface 24B' of frame 18B and intermediate the opposite side of drive nut 12B and surface 24B of frame 18B which is spaced-apart from and faces surface 24B'. More than one coiled spring may be utilized on either or both sides of drive nut 12B when it is desired to generate a particular biasing force as a result of compression of the springs as previously described. Surfaces 24B and 24B' are adapted to enable biasing means 20B and 20B' to respectively move frame 18B in a direction $D_2$ or $D_1$ in response to being pressed by movement of drive nut 12B in the respective direction along shaft 10B. Frame 18B is thus caused to move in a direction $D_1$ that is substantially parallel to the central longitudinal axis of shaft 10B when drive nut 12B moves towards the viewer's right and is caused to move in a direction $D_2$ that is substantially parallel to the central longitudinal axis of shaft 12B when drive nut 12B moves towards the viewer's left. Operating means 22B associated with frame 18B for performing an operation at each operating station located along directions $D_1$ and $D_2$ is connected to frame 18B in the manner shown in FIG. 3. Means 22B is a linking member in the form of a fork or other suitable shape that is adapted to engage clutch 30 which is slidably engaged with output shaft 36 by means of splines or the like, not shown, so that clutch 30 is able to be moved in either direction $D_1$ or $D_2$ along shaft 34 and will cause output shaft 36 to rotate when clutch 30 is rotating. First gear 32 and second gear 34 are mounted on shaft 36 in such a manner that they are not able to rotate shaft 36 until clutch 30 has been engaged respectively with each. Clutch 30 has external splines 35 that are adapted to engage with internal splines in gears 32 and 34, not shown, when clutch 30 is moved by means 22B into engagement therewith. Input shaft 37 has gear 38 fixedly secured thereto that engages with gear 34 and causes gear 34 to rotate in response to rotation of shaft 37. Input shaft 37 also has gear 39 fixedly secured thereto that engages with gear 32 and causes gear 32 to rotate in response to rotation of shaft 37. Thus, when external splines 35 of clutch 30 are engaged with the internal splines of gear 32, rotation of shaft 37 causes shaft 36 to rotate according to the pitch diameter relationship between gears 32 and 39 and, when external splines 35 of clutch 30 are engaged with the internal splines of gear 36, rotation of gear 38 causes shaft 36 to rotate according to the pitch diameter relationship between gears 34 and 38.

Movement of frame 18 in opposite axial directions $D_1$ and $D_2$ causes means 22B to slide clutch 30 along shaft 36 and engage gears 32 and 34 in the manner described. Clutch 30, however, will encounter a resistance to engagement with gears 32 and 34 due to their respective rotation about shaft 36. Continued rotation of shaft 10B, causing drive nut 12B to press against spring 20B' which in turn urges frame 18 and means 22B in direction $D_1$, causes spring 22B to compress and place means 22B in a preloaded condition such that, when gear 32 is slowed or stopped from rotating or otherwise sychronized with the rotation of clutch 30 by an occurrence such as releasing an accelerator pedal or engaging a clutch that is able to stop or otherwise alter the speed or rotation of shaft 37 in the manner desired, external splines 35 of clutch 30 are able to be engaged with the internal splines of gear 32 by the biasing force on means 22 arising from spring 20B'.

Likewise, when frame 18B and means 22B are moved in direction $D_2$ by drive nut 12B in response to rotation of shaft 10B in an opposite direction, compression of a spring 20B is able to urge the external splines of clutch 30 into engagement with the internal splines of gear 34 upon the occurrence of an event such as engaging a clutch or releasing an accelerator pedal so as to synchronize the rotational speed between the respective splines. Thus, the mechanism of the invention is able to preload an operating component thereof sufficiently to perform an operation at each one of at least two spaced-apart operating positions by overcoming the resistance required to perform the operation such as in the case of the resistance of valves 26 and 26' of FIG. 1 or when the resistance is removed such as by the synchronization of the rotational speeds of input shaft 37 and output shaft 36 of FIG. 3.

FIG. 4 shows an embodiment of the mechanism of the invention in the form of mechanism 72 that is similar to mechanism 70 excepting that biasing means 20C and 20C' are in the form of spring clips rather than coiled springs and means 50 are provided for stopping movement at frame 18C at the desired operating positions in opposite axial directions $D_1$ and $D_2$. The suffix "C" is used to denote components of mechanism 72 that have been previously described with respect to FIGS. 1, 2 and 3. Spring clips 20C and 20C' are supported in frame 18C by means of components 24C and 24C' respectively that are in the form of an indentation in the wall of frame 18C shaped to properly support spring clips 20C and 20C' in their respective positions. As previously described, movement of drive nut 12C in opposite axial directions along shaft 10C causes drive nut 12C (by means of protuberances 16C) to press respectively against spring clips 20C' when drive nut 12C is moving in direction $D_1$ toward the viewer's right and against spring clips 20C when moving in direction $D_2$ toward the viewer's left. Operation means 22C in the form of a shift fork or the like extends downwardly from frame 18C and is the means by which movement of frame 18C in response to rotation of shaft 10C is able to preload means 22C sufficiently to enable the operation to be performed by means 22C by overcoming the resistance to performing the particular operation or upon the removal of the resistance as previously described with respect to mechanisms 66, 68 and 70.

Frame 18C is also provided with protuberances 48 as shown in FIG. 3. Protuberances 48 provide a means for stopping the rotation of shaft 10 in either direction by closing electrical contacts 50 when frame 18C moves in direction $D_1$ toward the viewer's right and by closing electrical contacts 50' when frame 18C moves in direction $D_2$ toward the viewer's left. Protuberances 48 are positioned so that shaft 10 stops rotating when spring clips 20C and 20C' have been respectively compressed sufficiently to apply a biasing force to frame 18C sufficient to enable operating means 22C to overcome the resistance arising from the particular operation to be performed at the operating position or otherwise sufficient to enable the operation to be performed upon an occurance of an event that diminishes or otherwise removes the resistance as previously described.

It is to be understood that the closing or opening of electrical contacts such as contacts 50 and 50' of FIG. 4 is only one means by which to stop rotation of the threaded shaft of the mechanism of the invention so as to stop the operation member in a preloaded condition at the operating position and that the mechanism of the invention includes any means for stopping the rotation of the shaft in opposite directions at the particular operating position in either direction desired or by stopping the movement of the drive nut with or without stopping the rotation of the shaft such as by means of undercuts 13 of mechanism 66 of FIG. 1 when the respective biasing means have been sufficiently compressed to apply a biasing force to the frame sufficient to enable the operating means associated with the frame to perform the operation desired to be performed at the particular operating position by overcoming the resistance arising from the operation or otherwise upon removal of the resistance upon the occurance of an event enables the operation to occur.

The stopping means may also be included in the form of a time factor T as shown in FIG. 3 for input signals $S_1$ and $S_2$ which in conjunction with the pitch of the threads of the shaft enables a single or a series of input signals $S_1$ and $S_2$ to rotate the shaft of the mechanism for a period of time sufficient to position the operating means at the desired operating positions in a preloaded condition as hereinbefore described.

What is claimed is:

1. A shifting mechanism for positioning a means for performing at least one operation in a preloaded condition at each of at least first and second spaced-apart operating positions comprising:

a threaded shaft having a central longitudinal rotational axis between opposite ends thereof, driving means operable to cause the shaft to rotate in either one direction or in an opposite direction about the central longitudinal rotational axis thereof, a drive nut threadingly mounted on the shaft in such a manner as to move axially in one direction along the shaft when the shaft is rotated in the one direction and able to move axially along the shaft in an opposite direction when the shaft is rotated in the opposite direction, a frame moveably disposed with respect to the shaft and the drive nut and able to move in a first direction to the first operating position in response to movement of the drive nut in the one direction and able to move in a second direction to the second operating position in response to movement of the drive nut in the opposite direction, first resilient biasing means disposed intermediate the drive nut and a first component of the frame, second resilient biasing means disposed intermediate the drive nut and a second component of the frame spaced apart from the first component of the frame, operating means associated with the frame enabling the performance of the operation upon movement of the frame respectively to the first and second operating positions, and means enabling the frame and operating means to stop respectively at the first and second operating positions, said means comprising an undercut in the shaft adapted to cause the drive nut to free-wheel without further advancement along the shaft when the operating means reaches the first and second operating positions respectively, said driving means, shaft, drive nut, frame, operating means and first and second biasing means operably associated such that (1) rotation of the shaft by the driving means in the one direction causes the drive nut to move in the one direction axially along the shaft and cause the first biasing means to press against the first component of the frame and move the frame and the operating means associated therewith in the first direction to the first operating position and stop thereat and be compressed sufficiently by any resistance encountered to place the operating means in a preloaded condition sufficient to apply a biasing force against the frame sufficient to enable the operating means to perform the operation by overcoming the resistance or upon removal of the resistance upon the occurrence of an event enabling the operation to occur and (2) rotation of the shaft by the driving means in the opposite direction causes the drive nut to move in the opposite direction axially along the shaft and cause the second biasing means to press against the second component of the frame and move the frame and the operating means associated therewith in the second direction to the second operating position and stop thereat and be compressed sufficiently by any resistance encountered to place the operating means in a preloaded condition sufficient to apply a biasing force against the frame sufficient to enable the operating means to perform the operation by overcoming the resistance or upon removal of the resistance upon the occurrence of an event enabling the operation to occur.

2. A shifting mechanism for positioning a means for performing at least one operation in a preloaded condition at each of at least first and second spaced-apart operating positions comprising:

a threaded shaft having a central longitudinal rotational axis between opposite ends thereof, driving means operable to cause the shaft to rotate in either one direction or in an opposite direction about the central longitudinal rotational axis thereof, a drive nut threadingly mounted on the shaft in such a manner as to move axially in one direction along the shaft when the shaft is rotated in the one direction and able to move axially along the shaft in an opposite direction when the shaft is rotated in the opposite direction, a frame moveably disposed with respect to the shaft and the drive nut and able to move in a first direction to the first operating position in response to movement of the drive nut in the one direction and able to move in a second direction to the second operating position in response to movement of the drive nut in the opposite direction, first resilient biasing means disposed intermediate the drive nut and a first component of the frame, second resilient biasing means disposed intermediate the drive nut and a second component of the frame spaced apart from the first component of the frame, operating means associated with the frame enabling the performance of the operation upon movement of the frame respectively to the first and second operating positions, and means enabling the frame and operating means to stop respectively at the first and second operating positions, said means comprising a timed signal which causes the driving means to stop rotation of the shaft when the operating means reaches the first and second operating positions respectively, said driving means, shaft, drive nut, frame, operating means and first and second biasing means operably associated such that (1) rotation of the shaft by the driving means in the one direction causes the drive nut to move in the one direction axially along the shaft and cause the first biasing means to press against the first component of the frame and move the frame and the operating means associated therewith in the first direction to the first operating position and stop thereat and be compressed sufficiently by any resistance encountered to place the operating means in a preloaded condition sufficient to apply a biasing force against the frame sufficient to enable the operating means to perform the operation by overcoming the resistance or upon removal of the resistance upon the occurrence of an event enabling the operation to occur and (2) rotation of the shaft by the driving means in the opposite direction causes the drive nut to move in the opposite direction axially along the shaft and cause the second biasing means to press against the second component of the frame and move the frame and the operating means associated therewith in the second direction to the second operating position and stop thereat and be compressed sufficiently by any resistance encountered to place the operating means in a preloaded condition sufficient to apply a biasing force against the frame sufficient to enable the operating means to perform the operation by overcoming the resistance or upon removal of the resistance upon the occurrence of an event enabling the operation to occur.

3. The mechanism of claim 1 or 2 wherein the first and second biasing means are disposed coaxially about the shaft.

4. The mechanism of claim 1 or 2 wherein the frame is disposed coaxially about the shaft and the drive nut.

5. The mechanism of claim 1 or 2 wherein the frame is disposed coaxially about the shaft and the drive nut and the first and second biasing means.

6. The mechanism of claim 1 or 2 wherein the first and second frame components respectively comprise first and second facing surfaces of the frame.

7. The mechanism of claim 1 or 2 wherein the first direction of movement of the frame is substantially the same as the direction of movement of the drive nut in the one direction along the screw and the second direction of movement of the frame is opposite to the first direction.

8. The mechanism of claim 1 or 2 wherein the first biasing means comprises at least one coiled spring and the second biasing means comprises at least one coiled spring.

9. The mechanism of claim 1 or 2 wherein the first and second biasing means are disposed coaxially about the shaft and the frame is disposed coaxially about the shaft and the drive nut and the first and second biasing means and the first and second frame components respectively comprise first and second frame surfaces that face towards each other and the first direction of movement of the frame is a direction that is substantially the same as the direction of movement of the drive nut in the one direction along the shaft and the second direction of movement of the frame is opposite to the first direction.

10. The mechanism of claim 1 or 2 wherein the first biasing means comprises at least one coiled spring and the second biasing means comprises at least one coiled spring.

11. The mechanism of claim 1 or 2 wherein the operating means associated with the frame comprises at least one linking member connecting the frame to a clutch that is able to be moved in response to movement of the frame and the operation to be performed is engagement of the clutch with a first gear engageable therewith at the first operating position and with a second gear engageable therewith at the second operating position and the operating means is preloaded sufficiently to enable engagement respectively with the first and second gears upon the occurrence of the event enabling the engagement to occur.

12. The mechanism of claim 1 or 2 having only one operating position in the first direction and only one operating position in the second direction.

13. The mechanism of claim 11 having only one operating position in the first direction and only one operating position in the second direction that are spaced-apart such that the only frame movement required in the respective movement of the frame in the first and second directions for a distance sufficient to preload the linking member sufficiently to urge the engagement between the clutch and the first gear and between the clutch and the second gear upon the occurrence of the event enabling the respective engagement to occur.

14. The mechanism of claim 11 wherein at least one of said clutch and of said first and said second gears is rotating and the biasing force on the frame is sufficient to enable the linking member to urge the clutch into engagement with each of said gears when the rotative relative speed therebetween is sufficiently synchronized to enable engagement.

* * * * *